Patented Dec. 14, 1937

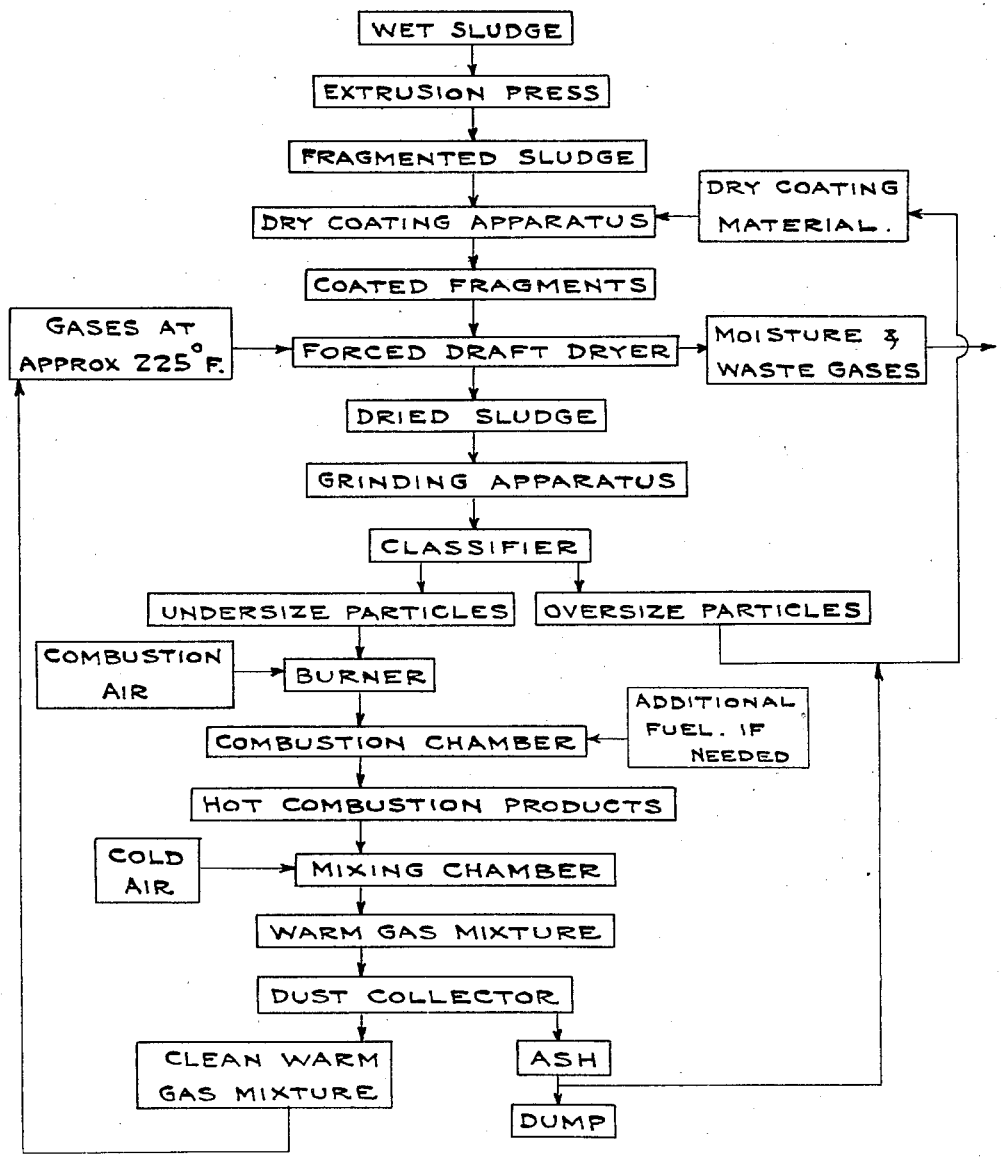

2,102,427

UNITED STATES PATENT OFFICE 2,102,427

METHOD OF TREATING WASTE WET ORGANIC MATERIAL

Richard L. Lloyd, Great Neck, N. Y., and Henry J. Stehli, Cedar Grove, N. J.; Stella Warde Lloyd executrix of said Richard L. Lloyd, deceased Application June 22, 1932, Serial No. 618,676

2 Claims. (Cl. 110—8)

This invention relates to a method for the treatment of wet organic materials, such as sewage sludge, in a hygienic manner, without the production of offensive odors or objectionable by-products.

Sewage sludge—i. e., the sludge produced by filtering activated and digested sewage, comes from the filter in the form of a thick mud, containing as a rule about 80 per cent water. The disposal of this material is a serious problem, as if it is carried off to be dumped at sea (as is done by some municipalities on the coast) the work of barging it to sea is expensive, more especially as it is necessary to haul about four tons of water to each ton of solids. Attempts have been made to convert the sludge into fertilizer, but there is considerable difficulty in disposing of the product, as the fertilizer industry is a highly seasonal one, whereas the production of sludge is practically uniform throughout the year, and the dried sludge is bulky, requiring much storage space. Furthermore, its nitrogen content is relatively low, so that it can be sold only at low prices.

Sewage plants having only a small amount of sludge to handle frequently dispose of it by spreading a thin layer on the ground and leaving it exposed to the sun for a few weeks, but this is impossible in the case of plants having many tons of sludge to dispose of daily, as will be readily understood.

Some attempts have been made at burning the dried sludge in kilns or stokers, but while this method succeeds in disposing of it, the burning is accompanied by the production of clouds of dense smoke due to distillation products and odors so offensive as to make it intensely disagreeable if not impossible for people to live in the neighborhood. Consequently such plants can only be operated at points distant from the municipalities where the sewage is produced, with consequent heavy expense for pumping and other losses.

In the present invention a method is disclosed by which large quantities of waste wet organic material, such as sewage sludge, may be dried rapidly and economically and be burned completely, without producing disagreeable odors or smoke, and leaving only a small amount of clean ash to be handled. The invention can be practiced in inhabited districts without offense, so that the plant can be built in the most suitable locality, without fear of damaging adjacent property. The invention further provides a method for drying and disposing of the sludge in which the fuel value of the sludge itself is utilized for the operation.

The accompanying flow sheet shows in diagrammatic form various steps of the invention, but it will be understood that the order in which the operations are conducted may be varied to a degree and that certain substitutions and alterations may be made without departing from the spirit of the invention.

It has been discovered that sewage sludge can be artificially dried without the production of disagreeable odors if the drying is carried on at temperatures close to the boiling point of water, which is lower than the distillation point of the objectionable gases. For example, when a certain sludge was dried at 225° F. no odor was given off, when dried at 250° F. there was a distinctly noticeable disagreeable odor, but when dried at 300° F. the odor was so intense as to drive the workmen out of the room containing the drying apparatus. Ordinarily the time required to evaporate four pounds of water from one pound of solids in sewage sludge (the proportion ordinarily present) at such a low temperature would be prohibitive, but by preparing the sludge and drying it as described below, the operation may be carried on rapidly and efficiently.

In practicing this invention, the waste wet organic material, such as sewage sludge, is first broken up and divided into small fragments, particles or shreds, in any desired manner. For example, the thick mud of sludge received from the filters may be extruded from a press through small orifices—say ⅛ to ¼ inch diameter—in the front plate, the sludge particles or shreds coming out as rods or threads of small diameter, which break up into short pieces as they come from the press. If left to themselves, these shreds or rods would rapidly re-unite to the original mud mass, but to prevent this they may be coated with dry dust, such as fine dried sludge from a later stage of the operation or fine ash, in a manner described in U. S. Letters Patent #1,673,891. The dust may be sifted onto the sludge rods as they come from the press, or the sludge may be extruded into a tumbling apparatus containing the dry dust. Such coating prevents the pieces of sludge from coalescing or adhering, so that they retain their form through the drying operation which follows. When the pieces have once received a coating, no more of the dry dust adheres to them, so that the amount of coating required is relatively small. Whatever method may be used to break up the sludge into small pieces, the above-mentioned coating of the particles with dry material will be found advantageous in maintaining the fragmentation.

The coated particles are next subjected to the drying operation, which may be conducted on a continuous forced draft dryer, such as the well-known "Dwight-Lloyd" drying machine for continuously treating the material, or in stationary pans for intermittently treating the material in batches. The coated particles are spread in a shallow layer on porous bottom containers and a blast of heated air or air mixed with combustion gases, at a temperature near to but below the distillation temperature of the sewage sludge, and below the combustion point of the resultant dried material, is forced through the layer until the moisture is removed. For example, a four inch bed of 1/8" diameter pieces, containing 80% moisture, can be dried in less than ten minutes, using gases heated to 225° F. The time required varies to some extent with the depth of the bed and the condition of the sludges, as will readily be understood. A highly flocculent sludge, for example, is more difficult to dry than one that is more granular, but in any case, the drying is a matter of a few minutes only. The most suitable depth of layer will depend on various conditions. Usually from three to six inches will be found satisfactory, but with a granular, open-bodied sludge layers of ten inches depth or more may be used.

By keeping the temperature low during the drying operation (for example approximately 225° F.) no distillation of the sludge itself occurs, and consequently there are no objectionable odors and the moisture laden gases can be wasted to the atmosphere freely. Some types of sludges are found which can be dried at temperatures up to 300° F. without giving off noxious gases. However, 300° F. is a temperature at which these sludges may ignite and burn when they are dry, by reason of the hot air passing through them, which will set fire to them. This premature burning immediately causes a distillation of noxious products from the sludge, which is the object of this invention to avoid. The air for the drying operation may be heated by combustion of the dried sludge, as described below, or may be heated by other means, as desired.

After drying, the sludge may next be finely ground or pulverized. This can be accomplished in a ball mill, rod mill or any suitable pulverizing apparatus. As the sludge is soft and friable, it grinds readily with little wear on the equipment. The pulverized material may be passed through a classifier.

A portion of the ground dried sludge, such as oversize particles, may be taken, if desired, for use as the dry dusting material, before mentioned, for coating the extruded divided wet sludge. The remainder, comprising most of the product of undersize particles, may now be fed in regulated amount into a stream of high velocity air and projected into a highly heated combustion chamber. The air and ground sludge should preferably be so proportioned as to give complete combustion—i. e., there should be only a slight excess of air, as it is desired to keep the combustion chamber at a high heat for the purpose of promoting the instant formation and simultaneous complete combustion of said noxious gases. In commencing the operation, the combustion chamber may be first brought to a high heat, as by burning oil, gas, etc. therein temporarily. Then when the ground sludge-air mixture is projected into the heated chamber, the combustible matter immediately ignites and burns completely and rapidly. If, however, the combustion chamber is not maintained at a sufficiently high temperature, the solid matter may burn, but readily volatile noxious gases will be distilled and escape before burning completely. Inasmuch as these gases carry the offensive odor, it will be seen that it is highly desirable that they be completely oxidized or burned to destroy the odor. It has been found that if the combustion chamber is maintained at a red heat, or preferably at a yellow heat, complete combustion is effected, and the heat of combustion of the dried sludge particles is sufficient to maintain the desired temperature. It will be apparent that the combustion chamber must be properly proportioned to the amount of material to be burned, as will be understood by one skilled in the art.

It has been found that the dried sludge need not be pulverized to the fineness required for burning pulverized coal. For example, when ground to sixty mesh, combustion was practically instantaneous. When ground to twenty mesh, the sludge burned practically as well except that the coarser particles dropped to the bottom of the combustion chamber where they finished burning under the influence of a small amount of air admitted through the bottom.

After leaving the combustion chamber, the spent gases, still at a high heat, may be admitted to a mixing chamber, where air in regulated amount is mixed with them. The admission of air may preferably be controlled by thermostat regulation which may be installed in the flue near the dryer and which may be set to admit more or less cold air as the temperature at that point exceeds the desired point, (say 225° F.), to avoid the formation of noxious gases when using the mixture of spent gases and air for drying additional material. The gas-air mixture may now be forced through a succeeding or additional bed of wet sludge particles in the drying apparatus to remove the moisture or water from the sludge particles without creating noxious gases.

In order to reduce or avoid carrying ash particles from the burned sludge back to the dryer, the gas-air mixture may be passed through a dust collector, such for example as a cyclone collector, placed between the mixing chamber and the dryer. There need, however, not be complete removal of ash, as a small amount carried into the dryer does no harm. The ash collected is fine—similar to the well known "fly ash",—and a part of it may, if desired, be used as the dry dusting material for coating the sludge particles leaving the extrusion press.

Ordinarily the heat units produced by the combustion of the dried ground sewage sludge will be found sufficient for the drying operation. In some cases, however, when the sludge contains more moisture than usual, or has been digested, some additional heat may be found necessary, and a supplementary burner using oil, gas or coal fuel, may be employed, to give the required additional heat units at the combustion chamber. Furthermore, under certain conditions, the drying operation may not require all of the available heat units, and the surplus may be utilized for other purposes, or, if desired, only the necessary portion of the dried sludge may be burned and the remainder may be marketed as dried sludge.

While the invention has been described in connection with the disposal of sewage sludge, it will be apparent that it may be applied also to other materials, particularly organic matter such as garbage, humus, and the like, which normally contain a high percentage of moisture and which give off offensive or noxious odors when heated but little above the boiling point of water.

The herein described invention provides a method for disposal of sewage sludge that is efficient, that completely eliminates dissipation of objectionable odors, and that reduces the proportion of material to be ultimately transported away to the small amount of incombustible ash in the sewage. The invention utilizes the fuel value of the sludge itself in the operation, requires no elaborate or expensive plant, and is economical to operate. Since no offensive odors result, the plant may be built close to the source of sludge without deleterious effect to the neighborhood.

Having now described our invention what we claim is:

1. The method of treating sewage sludge which comprises dividing a wet mass of said sludge into small fragments, coating the surface of each fragment with dry powdered material to such an extent as to prevent adjacent fragments from adhering one to the other, forming a layer of the coated fragments with air passageways extending from top to bottom of the said layer, passing a current of warm drying gases through the said passageways until the said fragments are substantially dry, the temperature of said gases being not in excess of about 225° F., grinding the dry fragments, classifying the ground material to sized and oversized portions, mixing the sized portion of the ground material with air and projecting the mixture into a combustion zone maintained at a temperature at least in excess of red heat, separating the dust from the resultant gases of combustion, drying other coated fragments with the cleaned gases, and coating other wet fragments with dry powdered material formed of a mixture of said ash and the oversized portion of the ground material.

2. The method of treating wet sewage sludge which comprises dividing the wet sludge into small fragments, coating the surface of each fragment with dry powdered material to a thickness adapted to prevent adjacent fragments adhering one to the other, forming a layer of said fragments with air passageways extending through the layer, circulating warm drying gases through the said passageways until the said coated fragments are substantially dry, the temperature of said drying gases not exceeding about 225° F., grinding the said fragments to relatively small particle size, classifying to size and oversize portions, mixing the sized portion of the ground material with air, feeding the mixture into a combustion zone maintained at a temperature at least above red heat, separating the dust from the resultant gases of combustion, mixing the cleaned gases with air to obtain warm drying gases for the drying of other layers of coated fragments, and mixing a portion of the recovered dust with the oversize portion of said ground dried material to form the dry powdered material for coating other wet fragments of said sludge.

RICHARD L. LLOYD.
HENRY J. STEHLI.